United States Patent [19]
Brown

[11] 3,712,708
[45] Jan. 23, 1973

[54] LENTICULAR PROJECTION SCREEN

[76] Inventor: John Brown, P.O. Box 201, New Hope, Pa. 18938

[22] Filed: Sept. 9, 1971

[21] Appl. No.: 178,990

[52] U.S. Cl..................................350/129, 350/120
[51] Int. Cl..............................................G03b 21/60
[58] Field of Search...............350/129, 125, 117, 120

[56] References Cited

UNITED STATES PATENTS

| | | | |
|---|---|---|---|
| 3,622,223 | 11/1971 | Brakell | 350/129 |
| 3,502,389 | 3/1970 | Hilborn | 350/129 |
| 2,552,455 | 5/1951 | Pond | 350/129 |
| 3,610,728 | 10/1971 | Firth | 350/120 |
| 3,473,862 | 10/1969 | Hauber et al. | 350/120 |

FOREIGN PATENTS OR APPLICATIONS 39,781 6/1957 Poland ..................350/129

Primary Examiner—Samuel S. Matthews
Assistant Examiner—Richard L. Moses
Attorney—Lawrence I. Lerner, Sidney David, Joseph S. Littenberg and Richard I. Samuel

[57] ABSTRACT

A lenticular projection screen consisting of a plurality of overlapping, spherical concave lenses formed in reflective material. The lenses and the screen are constructed so that projected light rays are directed to a predetermined viewing area in front of the screen, in order to reduce scattering losses and provide high quality screen images in a fully lighted room or in daylight.

7 Claims, 17 Drawing Figures

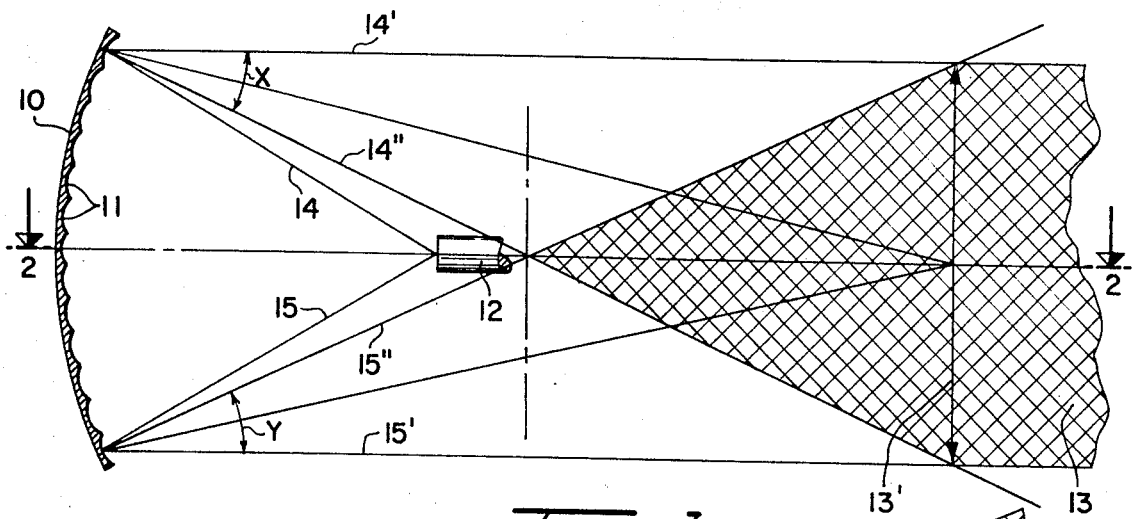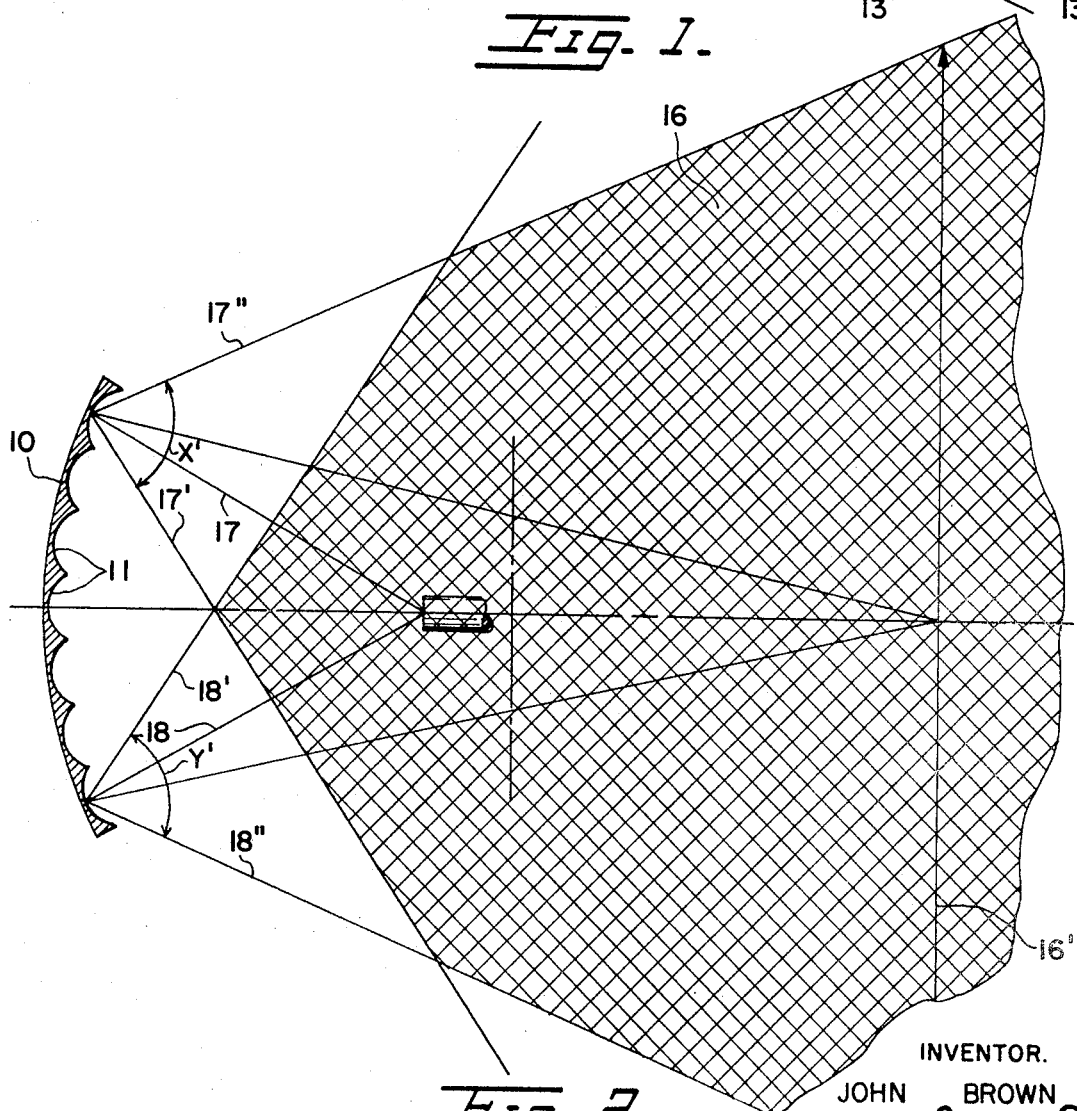

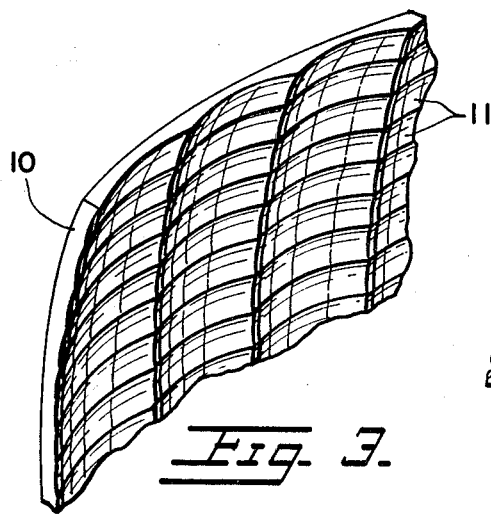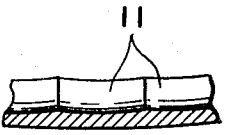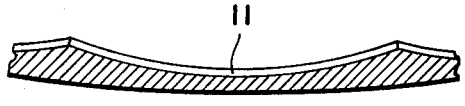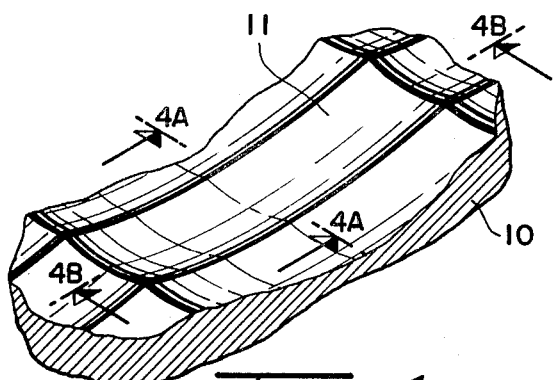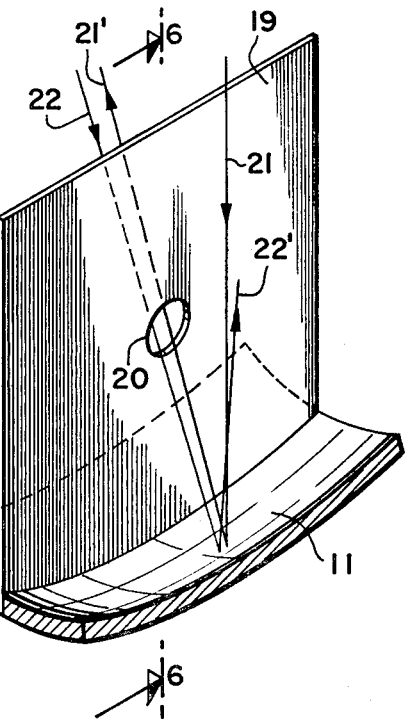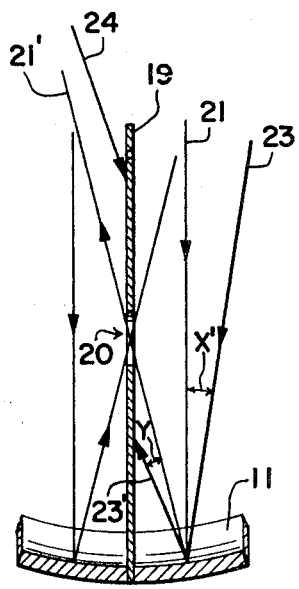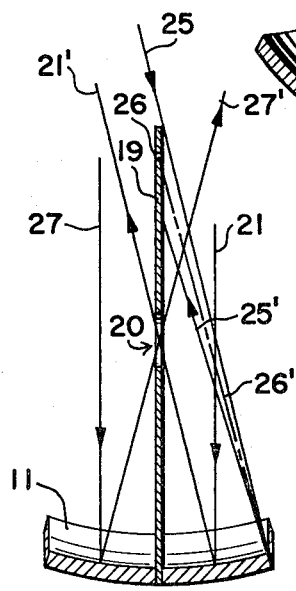

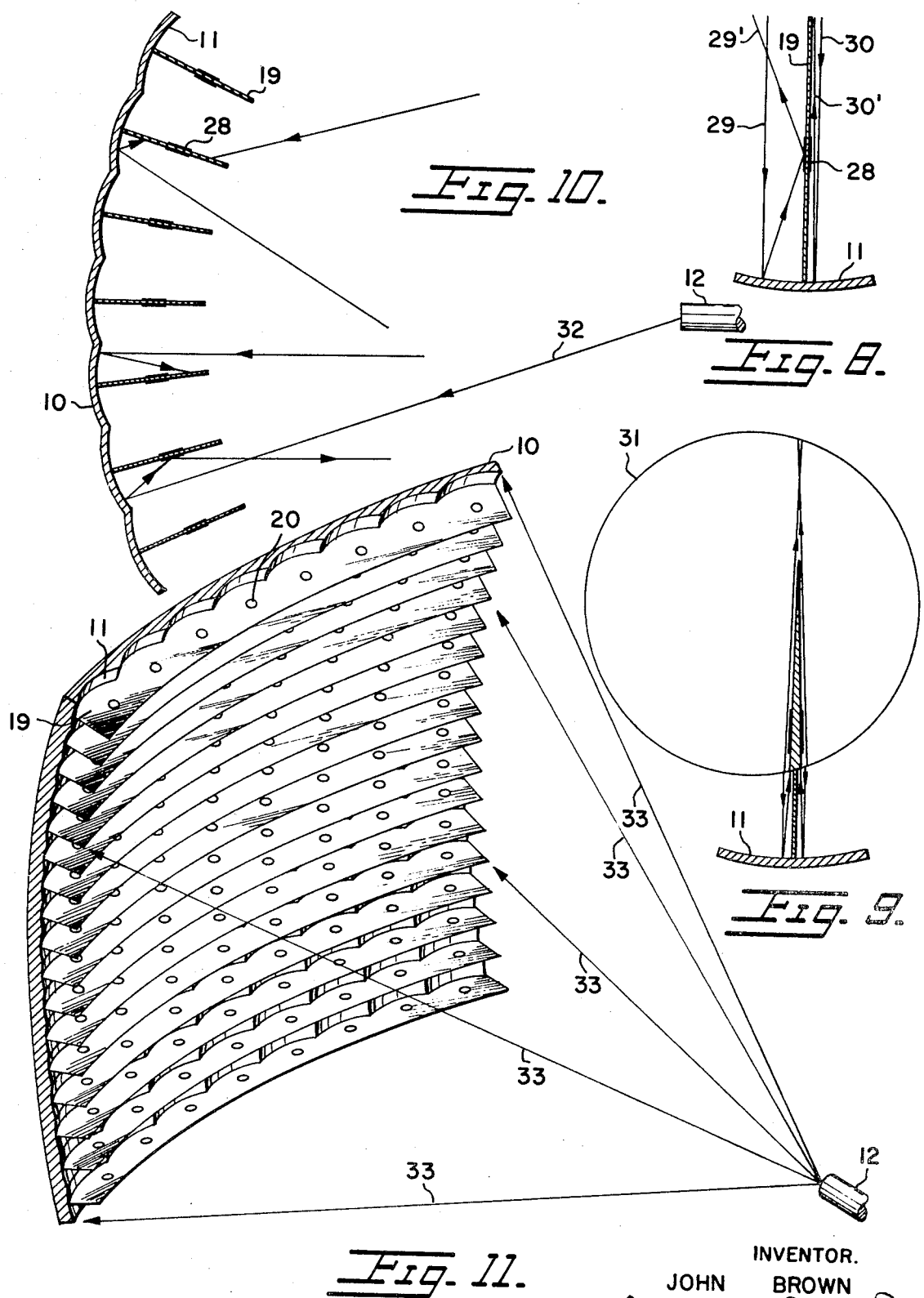

INVENTOR.
JOHN BROWN

ATTORNEY.

LENTICULAR PROJECTION SCREEN

The present invention relates to projection screens, and in particular, to a lenticular projection screen consisting of a plurality of concave lenses formed in a reflective material which selectively directs projected light rays to a predetermined viewing area.

Conventional projection screens usually scatter projected light rays indiscriminately to areas adjacent the screen. Consequently, they are not suitable for use in bright rooms since the light-transmission efficiency of the screen is greatly reduced. With such screens, light is scattered to the ceilings, floors, side walls, etc. of the room in which the projection screen is located. The more light admitted to a room, the lower the photographic quality of the screen image projected.

Accordingly, the present invention provides a lenticular projection screen consisting of a plurality of overlapping, spherical concave lenses formed in reflective material adjacent one another. The number of degrees of arc included in the height and width of the screen and each individual reflector determine the area to which the projected light is reflected. In order to increase the efficiency of the screen further, it may be provided with a plurality of light-absorbing planar members, affixed to, or bisecting the surface of, each individual reflective lens. The light-absorbent members may be gauze, or a rigid member having a flat black finish. The members are disposed perpendicular to the reflective surface of each individual lens, and are provided with either an aperture or a planar reflective member positioned at the focal point of each lens, so that reflected light rays travel through the aperture or bounce off the reflector during use of the screen. The light absorbing members, and each individual lens, may be horizontally or vertically disposed. The screen is particularly useful in a stereoscopic television system in which a polarized television picture is projected by a pair of camera lenses onto the lenticular screen, to be viewed by a person wearing polaroid glasses.

It is therefore an object of the present invention to provide a lenticular projection screen having a light reflection capability which is much greater than conventional projection screens.

It is another object of the present invention to provide a lenticular projection screen in which the projected light rays are directed to a predetermined, controlled viewing area, and which is substantially more efficient, and which produces brighter screen images, than previous screens.

It is also another object of the present invention to provide a lenticular projection screen whose light reflection efficiency is of such magnitude that the viewing of the screen images is possible in broad daylight.

It is a further object of the present invention to provide a lenticular projection screen which is simple in design, easy to manufacture, and efficient and reliable in operation.

Other objects and features of the present invention will become apparent from the following detailed description considered in connection with the accompanying drawings which disclose several embodiments of the invention. It is to be understood, however, that the drawings are designed for the purpose of illustration only and not as a definition of the limits and scope of the invention.

In the drawings, wherein similar reference characters denote similar elements throughout the several views:

FIG. 1 is a cross-sectional side view of a lenticular projection screen constructed in accordance with the present invention, showing the vertical viewing area of projected light rays reflected from the screen;

FIG. 2 is a cross-sectional, top view of the lenticular projection screen illustrated in FIG. 1, showing the horizontal viewing area of projected light rays reflected from the screen;

FIG. 3 is a partial, front perspective view of the lenticular projection screen illustrated in FIGS. 1 and 2;

FIG. 4 is a partial, cross-sectional perspective view of an individual lenticular lens of the projection screen illustrated in FIG. 3;

FIG. 4A is a partial, cross-sectional view of the lenticular projection screen, taken along section 4A—4A of FIG. 4;

FIG. 4B is a partial, cross-sectional view of the lenticular projection screen, taken along section 4B—4B in FIG. 4;

FIG. 5 is a perspective view of another embodiment of a lenticular lens of a projection screen constructed in accordance with the present invention;

FIGS. 6 and 7 are cross-sectional views of the lenticular lens, taken along section 6—6 of FIG. 5;

FIG. 8 is a cross-sectional view of another embodiment of the lenticular lens illustrated in FIG. 5;

FIG. 9 is a cross-sectional view of another embodiment of the lenticular lens illustrated in FIG. 8;

FIG. 10 is a side view of a lenticular projection screen comprising a plurality of the lenticular lenses illustrated in FIG. 8;

FIG. 11 is a front perspective view of a lenticular projection screen comprising a plurality of the lenticular lenses illustrated in FIG. 5;

Figure 12:
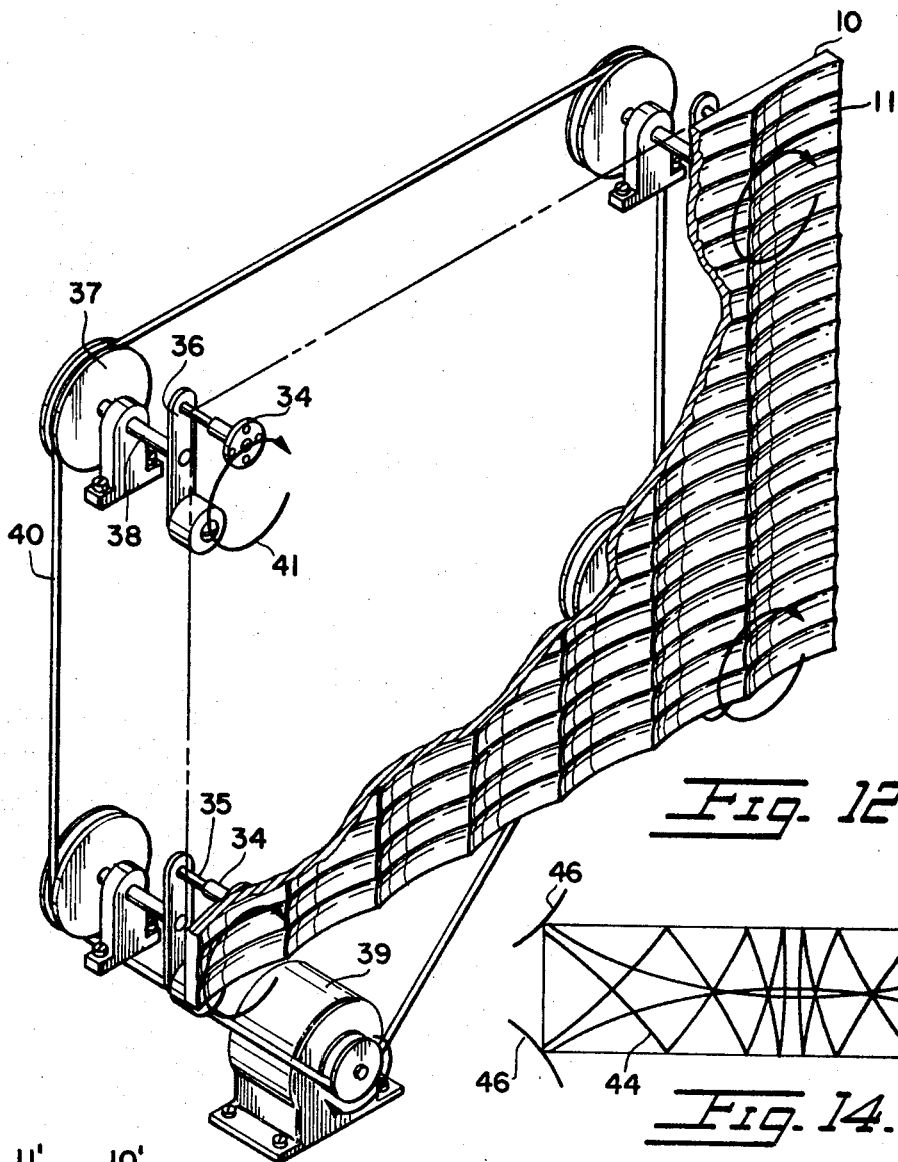
FIG. 12 is a partial, cross-sectional perspective view of another embodiment of a lenticular projection screen constructed in accordance with the present invention.

Referring to the drawings, FIG. 1-4 show a lenticular projection screen 10 having a plurality of spherically-shaped, overlapped lenses 11 which reflect light rays projected from a projection lens 12. Each of the lenses is formed in the screen by stamping a plurality of spherically-shaped recesses adjacent one another on reflective material, such as aluminum. By closely overlapping the stamped recesses, the configuration shown in FIG. 3 is obtained. It should be noted that the lenses need not be spherical, but may, for example, be parabolic in shape.

The viewing area, in which the projected screen images may be seen by the viewers, is controlled by the degrees of arc in each of the dimensions of the individual lenses. Since most viewers have their eyes at approximately the same height with respect to the floor of a projection room, the vertical viewing area, illustrated as cross-hatched area 13 in FIG. 1, need not be of great magnitude. It has been determined in most situations that a 3–½ foot vertical viewing area is sufficient to accommodate most groups of people, either standing or sitting. To produce this vertical viewing area, light rays must be reflected from each lens of the screen with a 20° reflection spectrum. Thus, projected light rays 14 and 15 must be reflected so that the reflection angle spectrum X and Y between reflected light rays 14' and 14", and 15' and 15", respectively is equal to 20°. A lens having a 10° arc in the vertical direction is sufficient to reflect the light rays with a 20° spread. Thus, the maximum width 13 feet of the vertical viewing area is approximately 3-½ feet. The closer the viewer gets to the screen, the smaller the vertical viewing area becomes, as illustrated in FIG. 1 by the converging light rays 14" and 15".

Since the viewers of the screen are spaced over a much greater horizontal area, the horizontal viewing area, shown as cross-hatched lines 16 in FIG. 2, must be much greater than the vertical viewing area. It has been determined that a 14-½ foot wide horizontal viewing area is sufficient for most projection purposes. To achieve this, an 80° spread angle spectrum between the reflected light rays from the screen is required. Thus, projected light rays 17 and 18 must be reflected from screen 10 so that the spread spectrum angles X' and Y' between reflected light rays 17' and 17", and 18' and 18", respectively, must be 80°. A lens having a 40° horizontal arc provides the required reflection angle. The screen images may then be viewed by a person located in the cross-hatched area, the width of the horizontal viewing area being 14-½ feet at the point 16'.

Screen 10 is also preferably spherically-shaped, so as to confine the reflected light rays to the vertical and horizontal viewing areas as much as possible. A flat screen may also be used, but the degrees of arc of the lenses in the horizontal and vertical directions would then have to be increased to maintain the same vertical and horizontal viewing areas, since the reflected light would be spread over a greater area. This would tend to decrease the light transmission efficiency of the screen. Alternatively, each lens could be tilted inwardly towards the center of the screen as its radially outward distance increased to maintain the desired viewing areas. Limiting the number of degrees of arc of the lenses has the advantage of providing lenses which have a configuration which approximates as close as possible a planar rectangle. This allows the lenses to be positioned adjacent one another, and have common edges, and thus eliminates non-reflective areas that would be present between lenses if, for example, they were circular in shape.

The radius of curvature of the spherical screen is determined by the following formula:

$1/F = 1/\text{projection distance} + 1/\text{viewer's distance}$, where $F = ½$ the radius of curvature Thus, when the projection lens is positioned 6 feet from screen 10, and the viewer's distance is 10 feet, the radius of curvature of the screen is 7-½ feet. For a screen having a vertical viewing area of 3-½ feet, and a horizontal viewing area of 14-½ feet, the most favorable viewing area would be at 13' and 16', the vertical and horizontal viewing areas, respectively, which occur at a distance of 10 feet from screen 10. It should be noted, that with the previously described screen, lenses 11 may also be convex in shape. The screen will reflect the light rays in the same manner as the concave lens screen.

If the light source is very weak, stray or ambient light so reduces picture contrasts that the previously described screen must be used in a darkened area. In order to use the screen in daylight, the screen is modified as shown in FIGS. 5-11. Lens 11 is provided with a planar, light absorbing member 19 which is disposed perpendicular to the surface of lens 11, and bisects its longitudinal center of curvature. Member 19 may be affixed to the surface of lens 11, or may physically bisect the lens, being inserted between the two halves of the lens as shown in FIG. 5. This latter configuration is preferable, since the reflecting area of the lens is not reduced, and member 19 is disposed at a right angle to the surface of lens 11.

Member 19 may be coated with a flat, black, light-absorbing material, such as paint, or may be covered with, or entirely composed of, gauze material, to absorb the light rays which impinge upon its surface. An aperture 20 is provided in member 19 at the focal point of the lens 11, and is disposed therein so that the focal point of the lens occurs at exactly the center of the circle. Thus, an incoming light ray 21 originating at an infinite distance and impinging on a lens along an axis parallel to member 19, which includes the optical axis of lens 11, is reflected through the focal point and aperture 20 as shown by reflected light ray 21'. Since the distance of the projection lens from screen 10 may be considered to be infinite when compared to the size of lenses 11, any light ray originating from the direction of the projector will, after impinging on the surface of the lenses, be reflected through the focal point and aperture 20 to the viewer's eye.

Incoming light ray 22 represents any light ray impinging upon the surface of lens 11 along an axis parallel to light absorbing member 19, but not parallel to light ray 21. The reflected light ray 22' will not pass through the focal point of the lens, but instead will strike the side of member 19 at approximately the same level as aperture 20.

Light ray 23 shown in FIG. 6 represents any light ray impinging upon the lens surface at an angle greater than the angle of incidence of light ray 21. This angle is measured with respect to light absorbing member 19. Since the angle X' between light ray 21 and light ray 23 must be equal to the angle Y' between the reflected light rays 21' and 23', reflected light ray 23' will impinge upon member 19 below the level of aperture 20 and be absorbed. Light ray 24 represents any one of a multitude of random light rays that impinge on the surface of light absorbing member 19 without being transmitted to the surface of lens 11. These light rays are immediately absorbed.

Light ray 25 represents a ray which impinges upon the surface of lens 11 at an angle which is less than that of ray 21. The angle at which this ray impinges on lens 11 is the minimum angle possible, since it is the last ray that is permitted to impinge on lens 11 by light absorbing member 19. The center of curvature 26 of the lens is disposed slightly below the upper end of member 19, and as a result, light ray 25 will impinge on the surface of lens 11 at an angle which is greater than the right angle at which the radius of curvature, represented by dotted lines 26' in FIG. 7, strikes the same point on the reflective surface of lens 11. Since the angle between light ray 25 and radius of curvature 26' must be equal, reflected light ray 25' will strike the side of light absorbing member 19 somewhere between center of curvature 26 and aperture 20.

From the foregoing discussion, it is obvious that only light rays which originate from the projection lens area will be reflected from screen 10 to the viewer. The diameter of aperture 20 about the focal point of lens 11 will determine the amount of light which will be reflected. Hence, decreasing the size of the aperture will result in increased light filtration and a brighter reflected image.

In some instances, the thickness of light absorbing member 19 may produce a "dark" area in which the images on the screen cannot be seen. This darkened area occurs between reflected light rays 21' and 27', which represent light rays leaving the surface of lens 11 at the minimum angle permitted by light absorbing member 19. No light rays are present between rays 21' and 27', and therefore no image can be seen.

If this difficulty is encountered, light absorbing member 19 may be modified as illustrated in FIG. 8. Instead of providing an aperture in light absorbing member 19, a reflective member 28, which may be a chrome or aluminum disc or rectangle, is positioned on both sides of member 19 about the focal point of lens 11. A light ray 29 reflected towards the focal point of the lens is thus reflected, as shown by ray 29'. The light ray is reflected as if it had impinged upon the surface of lens 11 on the opposite side of member 19. Any light ray, such as light ray 30, impinging upon the surface of lens 11 very close to member 19 is reflected along a path which is closely parallel to the entry path of the ray, as illustrated by ray 30' in FIG. 8. The darkened area in which the reflected screen images cannot be viewed is therefore reduced to an area having a width equal to that of light absorbing member 19. It is possible that some impinging light rays may straddle light absorbing member 19, and be reflected parallel to it without being reflected from reflecting member 28. Thus, it is important that the angle between the surface of lens 11 and the base of light absorbing member 19 be perpendicular. However, the viewer's ocular separation is usually sufficient so that the darkened area caused by this occurance is unnoticable.

FIG. 9 illustrates an additional modification of light absorbing member 19 to eliminate the darkened area in front of the screen. Light absorbing member 19 may be tapered as shown in FIG. 9 in enlarged section 31, beginning just before reflected member 28, so that most of the light rays which impinge upon the surface of lens 11 close to member 19 converge or cross adjacent its end.

FIGS. 10 and 11 illustrate embodiments of projection screens constructed of the lenses shown in FIG. 5-9. Light absorbing members 19 of each lens 11 are shown as being horizontally disposed. It should be noted that the lenses, and light absorbing members 19, may be disposed either horizontally or vertically, as desired. In FIG. 10, lens 11 are provided with reflective member 28 affixed to light absorbing members 19 about the focal point of the lens. As previously described, only light ray 32 originating from projection lens 12 will be reflected by members 28. The remaining light rays will be absorbed by members 19. In FIG. 11, members 19 are provided with apertures 20, through which impinging light rays are reflected.

In order to obtain maximum efficiency, lenses 11 are preferably disposed in a spherical screen which has a radius of curvature equal to the distance between projection lens 12 and screen 10. All of the members 19 included in the screen thus point directly towards projection lens 12 so that projected light rays 33 impinge upon the surfaces of the lenses 11 along an axis parallel to the optical axis of the lenses.

In order to obtain a clear, sharp picture with a screen constructed as shown in FIGS. 1–4, a large number of small lenses may be required, depending on the particular situation. In certain cases, it may not be feasible to work with small lenses which include the light absorbing member 19. In such situations, the screen 10 shown in FIGS. 1–4 may modified by mounting it on a motor-driven rotation means so that each lens in the screen describes an oscillatory motion, such as an identical circular motion. Screen 10 is rigidly affixed to four mounting members 34 disposed on pivotable rods 35. Lever arms 36 are connected to pulleys 37 by rods 38 and are driven by motor 39 through belt 40. When the motor is activated, the pulleys rotate screen 10 in the direction of arrows 41.

Figure 14:
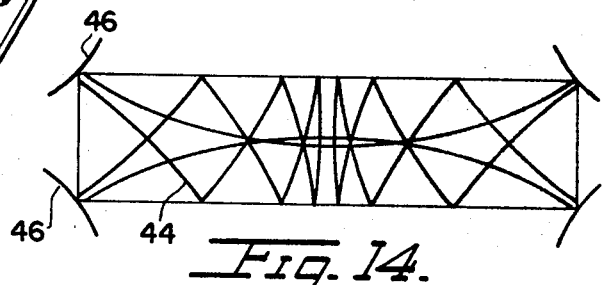
FIGS. 14 and 15 are schematic diagrams of the paths of selected lenses during rotation of the projection screen illustrated in FIG. 12.
Figure 13:
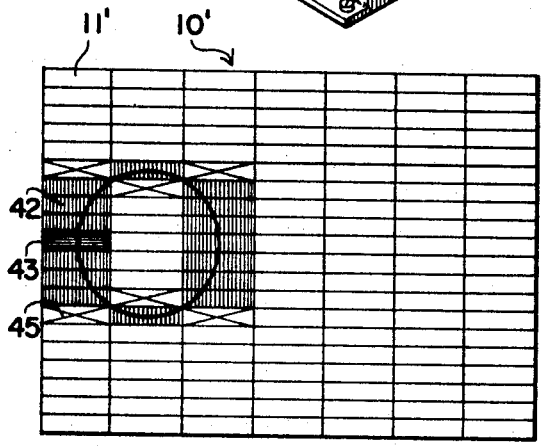
FIG. 13 is a schematic illustration of the screen illustrated in FIG. 12.
Figure 15:
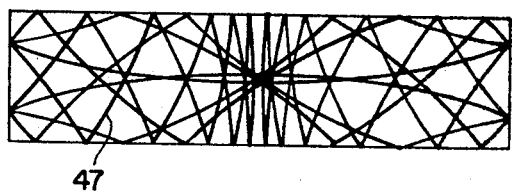

In the illustrated embodiment, lenses 11' of screen 10' have a length equal to four times their width. Thus, if the radius of rotation of the screen is equal to the length of one lens, the center of the vertically-hatched lenses 42 will pass through the center of horizontally-hatched lens 43 during each revolution of thescreen, and describe a path illustrated by lines 44 in FIG. 14. The center of lenses 45 pass through the corners of lens 43, and describe arcs 46 illustrated at the corners of the pattern of FIG. 14. If the radius of rotation of the screen is doubled, so as to be twice the length of lens 11', the center of lenses 42 pass through lens 43 so as to describe a path illustrated by lines 47 in FIG. 15. The total length of lines 47 is exactly twice the length of lines 44.

As an example of the operation of this embodiment, if the distance between projection lens 12 and screen 10 is 90 inches, the radius of curvature of lenses 11 2 inches, and the diameter of projection lens 12 3.5 inches, then the diameter of the ray of light reflected from each lens of screen 10 is approximately 1/50 inch. If lenses 11 have a length and width of 1 inch, and ¼ inch, respectively, screen 10 is rotated in a circle having a radius of 2 inches, and the rays of light describe a path illustrated by lines 47 shown in FIG. 15. The length of lines 47 is then approximately 12.7 inches. When this length of travel is multiplied by 1/50 inch (the diameter of the light rays), the total area swept by the light rays is .254 square inches. Since the area of the lens is .25 square inches, the area swept by the light rays is almost exactly equal to the area of each lens. However, since the area swept by the light rays is not uniform, the entire lens area is not covered by the light rays. As the radius of rotation of the screen increases, the paths covered increase in uniformity. The total length of the paths described also increases in direct proportion. The exact radius of rotation which is adequate to obtain a clear picture may be determined experimentally.

The frequency of rotation of the screen does not affect the quality of the picture reflected, except where it falls below certain required minimum values. For example, at a frequency of 1,800 rpm, each complete path pattern is completed 30 times per second, well above flicker thresholds. A much slower rate of rotation may be adequate, however, since many flashes would appear in a small area.

With the illustrated embodiment, large lenses, such as those previously described having a length of 1 inch and a length of ¼ inch, may be used. The construction of such lenses presents no difficulty when modified to include light absorbing members 19. Screen 10 has been illustrated as a flat screen in FIG. 12, having a flat rotating motion, to simplify explanation of the operation thereof. However, the most effective configuration, especially where the light absorbing members are included, is a spherically-shaped screen having a spherical rotating motion.

The projection screen of the present invention is particularly suitable for use in a stereoscopic television system (not shown). In such a system, a polarized television picture, which may be obtained by any one of a number of well known methods, is projected by a pair of projection lenses onto the lenticular screen of the present invention. The projected light rays are reflected in the same manner as described above. A viewer wearing a pair of polaroid glasses is thus able to view a three-dimensional projected image on the screen.

While several embodiments of the present invention have been shown and described, it will be obvious to those persons skilled in the art that many changes and modifications may be made thereunto without departing from the spirit and scope of the invention.

What is claimed is:

1. A lenticular projection screen comprising:
   a layer of light reflective material, having a plurality of overlapping, curved reflection lenses formed in the surface of said reflective material, each individual reflector having a predetermined number of degrees of arc included in the height and width thereof for selectively directing projected light rays from the screen to predetermined horizontal and vertical viewing areas, thereby reducing scattering losses and increasing the quality of the projected screen image;
   said reflective lenses being spherical and concave in shape; and
   a plurality of planar light absorbing members, disposed perpendicular to each of the surfaces of said lenses, bisecting the center of curvatures thereof, and having an aperture provided therein positioned at the focal length of each of said lenses, for allowing selective reflection of projected light rays originating from a predetermined source and absorbing ambient light rays impinging upon the surface of the screen.

2. The lenticular screen as recited in claim 1 wherein said light absorbing members further comprise a coating of flat, black paint for absorbing reflected light rays which impinge upon the surfaces of said light absorbing members.

3. A lenticular projection screen comprising:
   a layer of light reflective material, having a plurality of overlapping, curved reflection lenses formed in the surface of said reflective material, each individual reflector having a predetermined number of degrees of arc included in the height and width thereof for selectively directing projected light rays from the screen to predetermined horizontal and vertical viewing areas, thereby reducing scattering losses and increasing the quality of the projected screen image;
   said reflective lenses being spherical and concave in shape;
   a plurality of planar light absorbing members disposed perpendicular to the surface of said individual lenses, and bisecting the center of curvatures thereof, and having a reflective member thereon, positioned on both sides of said planar member at the focal point of said lenses, for selectively reflecting light rays projected from a predetermined source to predetermined viewing areas, and absorbing ambient light rays impinging on the screen during use;
   said planar members physically disect each of said lenses and are disposed between the halves of said lenses so as to disect the longitudinal center of curvatures thereof; and
   said planar members are tapered radially outwardly beginning at said reflective members, so as to reduce the non-viewing area present directly in front of each of said lenses along the outer edge of said planar members.

4. The lenticular screen as recited in claim 3 wherein said light absorbing members are coated with a flat, black light absorbant material for absorbing light rays impinging upon the surface of said planar members.

5. The lenticular screen as recited in claim 4 further comprising rotating means rigidly affixed to the lenticular screen for rotating each of said lenses of the screen in an identical, predetermined, radius of rotation, thereby allowing the use of large individual lenses to obtain a high quality projected screen image.

6. The lenticular screen as recited in claim 5 wherein the screen is spherically-shaped, and wherein the screen describes a spherical rotating motion.

7. A lenticular projection screen comprising:
   a layer of light reflective material, having a plurality of overlapping, curved reflection lenses formed in the surface of said reflective material, each individual reflector having a predetermined number of degrees of arc included in the height and width thereof for selectively directing projected light rays from the screen to predetermined horizontal and vertical viewing areas, thereby reducing scattering losses and increasing the quality of the projected screen image;
   said reflective lenses being spherical and concave in shape; and
   a plurality of planar light absorbing members, disposed perpendicular to each of the surfaces of said lenses, and having an aperture provided therein positioned at the focal length of each of said lenses, for allowing selective reflection of projected light rays originating from a predetermined source and absorbing ambient light rays impinging upon the surface of the screen.

* * * * *